(12) United States Patent
Fraenkel

(10) Patent No.: US 7,530,224 B2
(45) Date of Patent: May 12, 2009

(54) HYDRAULIC SPEED-INCREASING TRANSMISSION FOR WATER CURRENT POWERED TURBINE

(75) Inventor: Peter L. Fraenkel, London (GB)

(73) Assignee: Marine Current Turbines Limited, Bristol (GB)

( * ) Notice: Subject to any disclaimer, the term of this patent is extended or adjusted under 35 U.S.C. 154(b) by 81 days.

(21) Appl. No.: 10/536,771

(22) PCT Filed: Dec. 10, 2003

(86) PCT No.: PCT/GB03/05378

§ 371 (c)(1),
(2), (4) Date: Dec. 27, 2005

(87) PCT Pub. No.: WO2004/055365

PCT Pub. Date: Jul. 1, 2004

(65) Prior Publication Data

US 2006/0125242 A1    Jun. 15, 2006

(30) Foreign Application Priority Data

Dec. 13, 2002 (GB) ................................ 0229042.7

(51) Int. Cl.
*F16D 31/02* (2006.01)
(52) U.S. Cl. .......................................................... 60/398
(58) Field of Classification Search .................. 60/398
See application file for complete search history.

(56) References Cited

U.S. PATENT DOCUMENTS

| | | | |
|---|---|---|---|
| 4,149,092 A * | 4/1979 | Cros | ............................ 60/398 |
| 4,335,576 A * | 6/1982 | Hopfe | .......................... 60/398 |
| 4,383,182 A | 5/1983 | Bowley | |
| 4,498,017 A | 2/1985 | Parkins | |
| 4,850,190 A | 7/1989 | Pitts | |
| 5,324,988 A | 6/1994 | Newman | |
| 5,491,366 A | 2/1996 | Newman | |
| 6,091,161 A | 7/2000 | Dehlsen et al. | |
| 6,531,788 B2 | 3/2003 | Robson | |
| 6,652,221 B1 | 11/2003 | Praenkel | |
| 6,806,586 B2 | 10/2004 | Wobben | |
| 6,955,049 B2 | 10/2005 | Krouse | |
| 6,982,498 B2 | 1/2006 | Tharp | |

FOREIGN PATENT DOCUMENTS

| | | | |
|---|---|---|---|
| DE | 195 30 253 A1 | 11/1996 | |
| WO | WO 00 50768 | * 8/2000 | ................... 60/398 |

* cited by examiner

*Primary Examiner*—F. Daniel Lopez
(74) *Attorney, Agent, or Firm*—Brinks Hofer Gilson & Lione

(57) ABSTRACT

A hydraulic transmission system for use with at least one water current driven turbine rotor (6), low speed high pressure pump (24) is arranged to receive operational drive from the turbine rotor, and to deliver its output to a high speed hydraulic motor or turbine (35) in such manner as to produce an increase of the shaft or motor speed accompanied by a corresponding reduction of torque required to drive electrical generators (38) or other high speed machinery.

13 Claims, 3 Drawing Sheets

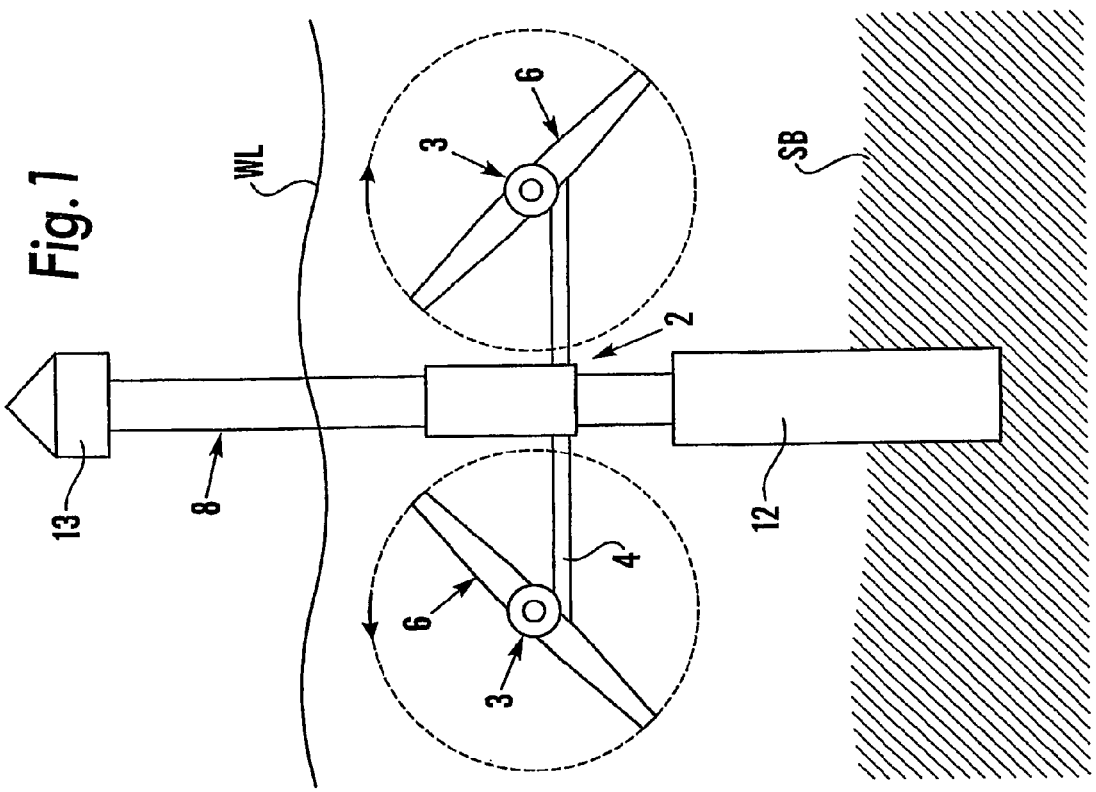
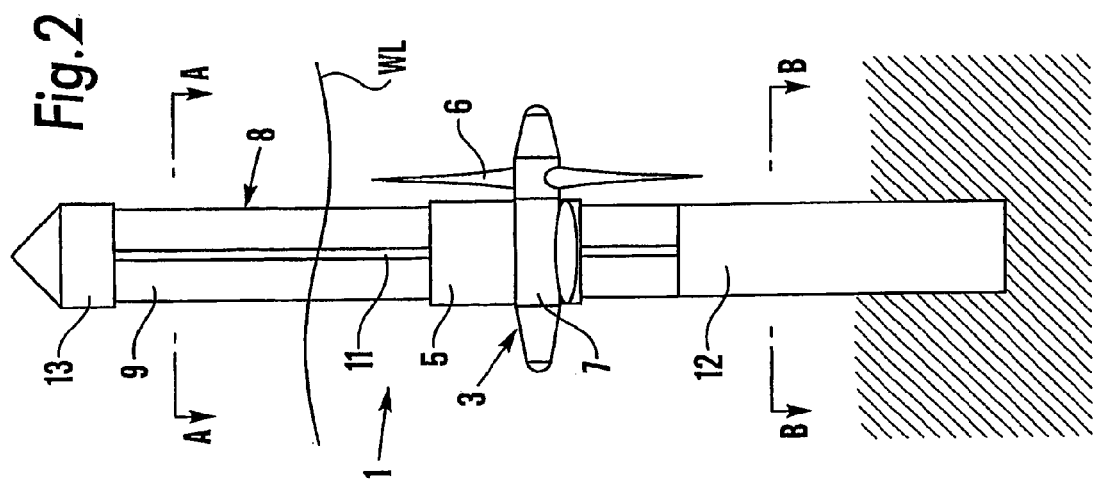
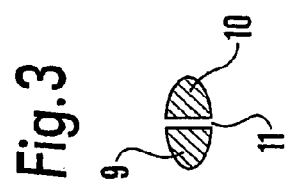
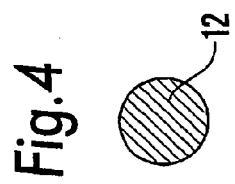

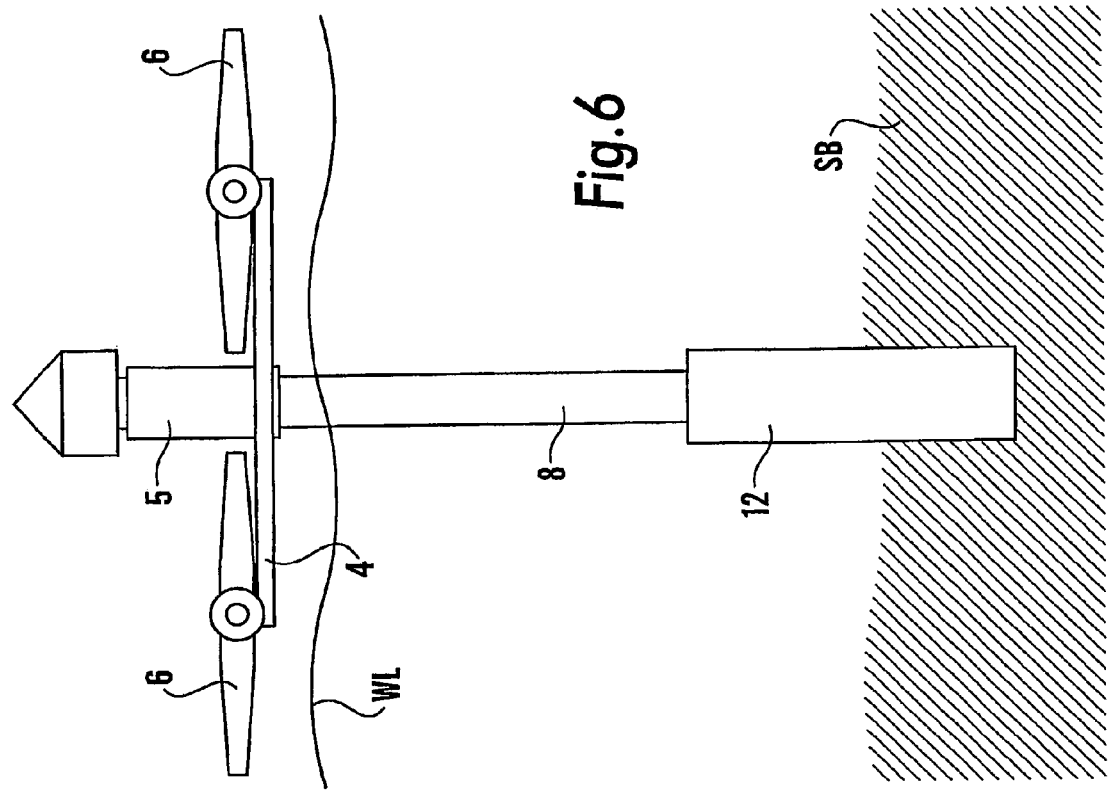
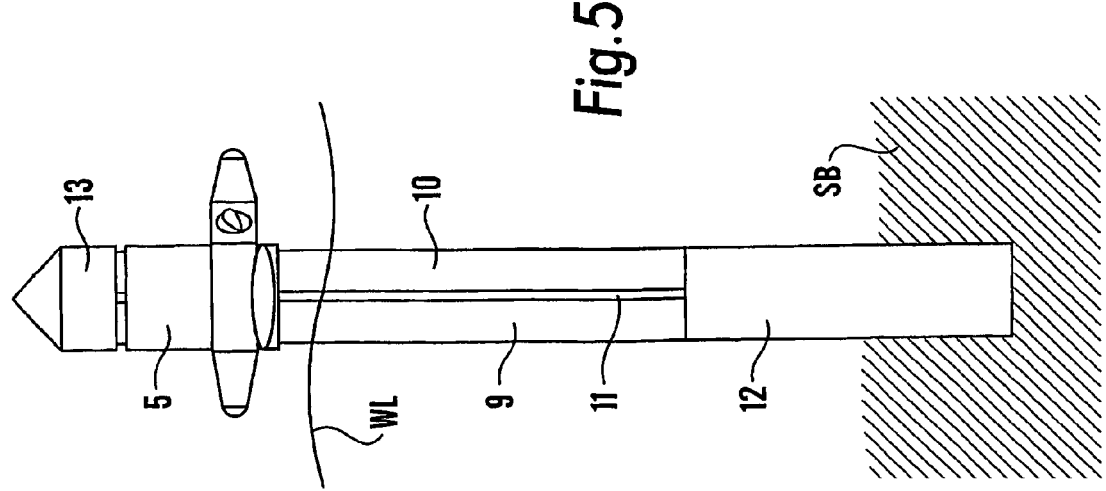

HYDRAULIC SPEED-INCREASING TRANSMISSION FOR WATER CURRENT POWERED TURBINE

BACKGROUND OF THE INVENTION

This invention relates to turbines and other such devices capable of interacting with a flow of fluid in such a manner as to transfer energy from the fluid to a mechanical device. This invention relates more particularly to turbines or other such devices arranged to be driven by the action of a flow of water or other liquid medium. Thus, the present invention relates in particular to the use of turbines and similar moving devices for extracting kinetic energy from flowing water for the purposes of utilising such kinetic energy to produce either electricity or shaft power for utilisation for a required purpose. Flowing water (which may be either fresh water or sea water) used in the context of this invention is a characteristic of tidal, marine, estuarial or river currents.

It is known how to use turbines for such purposes. For example, in our British Patents GB 2256011 B, GB 2311566 B and No 2348250 we have disclosed constructions pertaining to water driveable turbines; i.e. rotors supported within the water column of the sea, river or an estuary so that the flow of water may turn the rotor to produce shaft power and hence possibly electricity for utilisation for a required purpose.

In particular the present invention relates to a power transmission system for use with one or more such turbine rotors for extracting kinetic energy from flowing water and producing therefrom electricity by driving an electrical generator or alternator or for applying the power for some other useful purpose requiring a fast rotating shaft.

Generally a turbine for extracting kinetic energy from water currents, whether in a river or at sea, includes a rotor capable of interacting with the flow of water in such a way that some of the energy of motion of the passing mass of water causes the rotor to rotate. No matter what kind of rotor is used, whether an axial flow or propeller type of rotor or a cross-flow rotor of the so-called Darrieus type, or even some other form of hydrofoil device reacting against the flow of water currents, the rotation of a rotor driven by the movement of water currents will be slow due to the fact that even the fastest of water currents only run at relatively slow speeds in the range from 2 to 4 m/s at most and the rotor extremities cannot generally move much faster than 10 to 15 m/s. Consequently only small devices can rotate at reasonably high speeds since the larger the device i.e., diameter of the rotor, generally the smaller the angular movement in a given time.

Therefore, it becomes necessary to provide some means for speeding up the output gained from the rotation of a slow moving rotor in order to effectively drive an electrical generator or other relatively high speed machinery. For example an axial flow tidal or river current turbine rotor 15 m in diameter will typically rotate at about 10 revolutions per minute in a driving water current of 2 to 2.5 m/s (4 to 5 knots) but most conventional electricity generators typically require to be driven at shaft speeds of 1000, 1500 or more revolutions per minute. This situation indicates that there is therefore a need to increase the speed of the main turbine shaft by a factor of 100 or, more. The most generally proposed technique, which is prior art, is by using a multistage gearbox. However gearboxes of such a kind are complicated mechanically, heavy to handle, costly, suffer significant wear and require regular maintenance to replace the lubricant conventionally provided between relatively moving components of the turbines. Furthermore, gearboxes conventionally involved also introduce a hazard to the local environment should the lubricating oil leak out for any reason.

THE PRIOR ART

It is known how to use turbines for such above mentioned purposes. For example, in our British Patents GB 2256011 B, GB 2311566 B and No 2348250 we have disclosed constructions pertaining to water driveable turbines, i.e. rotors supported within the water column of the sea, river or an estuary so that the flow of water may turn the rotor to produce shaft power and hence possibly electricity for utilisation for a required purpose.

Thus the concept of immersing a rotor in a water current in order to extract energy has been tested and described, as for example, in our above mentioned British Patents.

OBJECT OF THE INVENTION

The object of the invention is to provide a method of and means for increasing the effective rotational speed of a rotating member.

STATEMENTS OF THE INVENTION

According to a first aspect of the invention there is provided a hydraulic transmission system for use with at least one water current driven turbine rotor, characterised in that a low speed high pressure pump or pumps is/are arranged to receive operational drive from the turbine rotor, and to deliver high pressure output to a high speed hydraulic motor or turbine in such manner as to produce an increase of the shaft or motor speed accompanied by a corresponding reduction of torque required to drive electrical generators or other machinery as compared with the shaft speed of the turbine rotor or rotors.

Preferably, a substantially closed hydraulic fluid circuit is provided for said hydraulic fluid associated with the low speed high pressure pump or pumps Conveniently the hydraulic fluid for said high pressure pump or pumps is/are arranged to be recirculated from a high speed hydraulic motor or turbine through a low pressure fluid return line or lines to feed said low-speed high-pressure hydraulic pump or pumps.

Preferably the hydraulic fluid is water.

Conveniently, any loss of the water from the system is arranged to be made up by drawing replacement water from the water within which said rotor or rotors is/are is operationally located.

In a preferred arrangement such make up water is filtered to remove suspended solids or other undesirable pollutants before being stored in a header tank situated in such a position that it can feed make-up water into the system to replace and water lost through leakage.

Since the hydraulic fluid is water is drawn from the operating environment of the turbine or turbines, a relatively high degree of fluid leakage can be tolerated, thereby to allow the use of larger than would otherwise be acceptable clearances relative movement for seals, the arrangement being such that the operation of the pumps can be optimised for mechanical efficiency rather than 100% retention of hydraulic fluid.

Preferably each said rotor is associated with a plurality of separate pumps arranged to be operationally driven from the associated rotor, and in that the hydraulic fluid inputs to the pumps are connected to receive fluid from a low pressure fluid plenum and the output sides of all said pumps are associated with a common high pressure plenum connecting via high pressure fluid circuit with the hydraulic motor or rotor coupled to drive a generator or other machinery In accordance with a further aspect of the invention a water drivable turbine is provided with a hydraulic power transmission system for increasing the effective speed of the turbine.

In accordance with a further aspect of the invention a hydraulic power transmission system using water as a working fluid is utilised to achieve the desired increment in speed to couple a low speed tidal or river current turbine rotor to a conventional electrical generator or to other high speed machinery.

In a preferred arrangement it is proposed to directly couple a low speed, positive displacement hydraulic pump to the turbine rotor drive shaft.

In particular the hydraulic pump may be of various types, such as, for example, a cam or crank driven single or multi-cylinder piston or plunger type of pump, or an internal or external type gear pump, a lobe pump or a vane pump.

Conveniently, pumps utilised may be presented in a variety of configurations, such that, for example, a piston or plunger pump may have a multiplicity of cylinders disposed radially around the cam or driving crank on the main shaft, or the cylinders may be disposed axially along a camshaft or crankshaft, or there may be a series of radially disposed cylinders set axially along a camshaft or crankshaft.

The concepts of the invention may be applied to water current turbines with more than one rotor, in which case each rotor will be coupled to a similar low speed, positive displacement pump fed with the same working fluid that the turbine runs in, whereby if the pump is in the sea it will be sea water, if in an inland river it may be freshwater. Therefore any minor leakage of hydraulic fluid will not create any environmental problem of polluting the surroundings and is acceptable.

In a particular-arrangement individual cylinders (with piston or plunger pumps) or the pump output will draw in water via non-return valves from a low pressure or supply manifold and similarly they will deliver at a higher pressure pumped water through a non-return valve into a high pressure manifold.

In practice the low pressure manifold will be connected to a low pressure supply pipe or feed pipe which will carry an adequate supply of working fluid to meet the needs of the pump(s). Similarly, the high pressure manifold will in turn be connected to a high pressure supply or transmission pipe and it may also interface with an accumulator capable of absorbing fluctuations or pulses in the output caused by the use of piston or plunger pumps (the use of an accumulator may not be necessary when rotary positive displacement pumps such as gear pumps are used, as their output tends to be relatively smooth and free from pressure pulses).

The low pressure and the high pressure transmission pipes will be led through the support structure of the tidal turbine to a convenient location for placing a water motor or Pelton Turbine connected to a generator. The water motor or Pelton turbine will generally be driven by one or more jets of water impinging on a specially shaped runner; such devices are prior art and well known.

In the application of this invention to the tidal turbine concept we have previously described in our British Patents GB 2311566 and 2348250, the turbines are mounted on a mono-piled support structure that is installed in a socket drilled into the seabed or river bed and the upper end of said support mono-pile emerges above the surface of the flowing water current. When the concept of the invention is applied to this method for extracting kinetic energy from currents then the low pressure and the high pressure transmission pipes will carry the flow to and from a water motor or Pelton Turbine driving a generator that is preferably located above the surface of the water in a weather proof housing on the top of the supporting mono-pile.

Conveniently, however the housing for the water motor or Pelton Turbine may in some cases be a water tight casing located under the surface in the case of turbine/control systems that do not penetrate the water surface.

Preferably, the water used in the system of the present invention is filtered so as to be free of significant quantities of suspended solids or debris which would otherwise prematurely wear the components of both the pumps and the water motor or Pelton Turbine.

Conveniently, also the water may also be dosed with a non-harmful (bio-degradable or bio-friendly) lubricant to help minimise wear and tear of seals and moving components in the system.

Preferably any makeup water required for the proposals of the present invention is drawn through a strainer and then a filter by an ancillary pump and fed into a header tank or storage tank; it being arranged that said pump only functions at times when a float or other level indicating transducer signals that the water level in the header or storage tank has fallen below some predetermined level and ceases to function when the header or storage tank is replenished to another higher predetermined level.

In particular the aforementioned storage or header tank is linked to the water return feed pipe which collects water from below the Pelton Turbine or water motor and returns it to the feed manifold of the low speed, high-pressure pump (or pumps).

BRIEF DESCRIPTION OF THE DRAWINGS

For a better understanding of the invention and to show how to carry the same into effect reference will now be made to the accompanying drawings in which:

FIG. 1 is a schematic front view of a water current turbine system as disclosed in our co-pending British Patent Application No 0327429,7 the Figures illustrating the installation when the turbines and associated rotors are submerged in water;

FIG. 2 is a schematic side view of the installation of FIG. 1,

FIG. 3 is a section on the line A-A of FIG. 1,

FIG. 4 is a section on the line B-B of FIG. 1;

FIGS. 5 and 6 schematically illustrate the installation of FIGS. 1 to 4, when the turbines and associated rotors are raised to a location above seal level.

Referring now to FIGS. 1 to 4. these Figures illustrate a support column 1 for mounting a turbine assembly 2. The lower end of the column 1 is embedded in a river/seabed SB and is of such length that the upper end thereof is above water level WL. In the FIGS. 1 to 4 the turbine assembly is shown as comprising two turbine units 3 mounted one to each of the extremities of a horizontal wing-like support structure 4 including an internal spar (not separately shown) within an outer housing (not separately shown) streamlined in cross section. The structure 4 is carried by a collar like sleeve 5 longitudinally displaceable lengthways of the support column 1. The profiling of the structure 4 is such as to assist in reducing as far as possible the creation of undesirable water drag effects in water passing over the surface of the structure 4 and to minimise the water wake at the trailing edge of the structure. In practice the direction of water flow across the structure can be tidal and thus reversible in direction across the structure 4. This requires that the profiling of the structure has also to be bi-directional so that it is operationally efficient in both directions of water flows.

Figure 7:
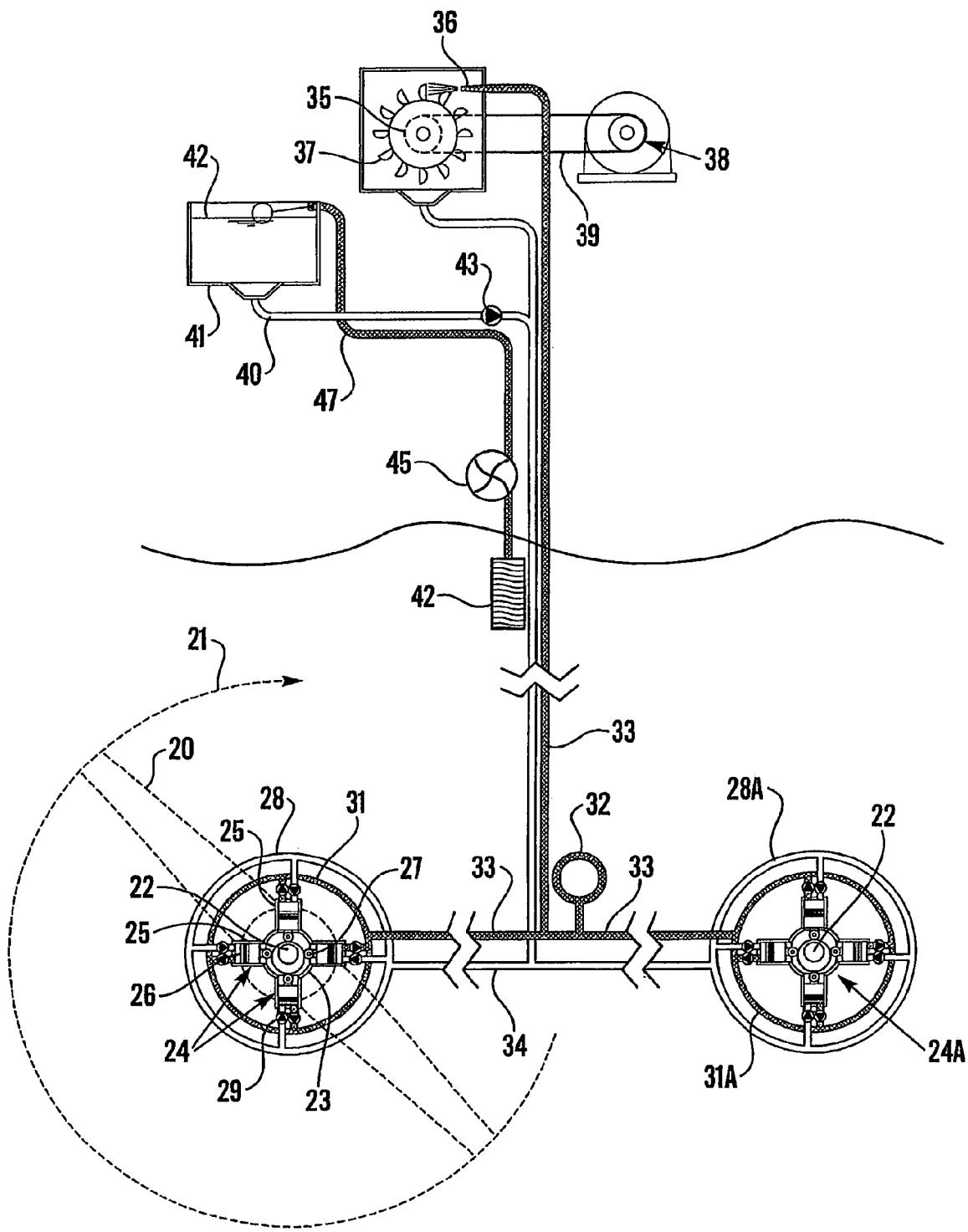
FIG. 7 is a schematic diagram schematically illustrating an embodiment of the present invention when used with an installation illustrated in FIGS. 1 to 6.

Each turbine unit 3 includes a rotor 6 carried by a rotor shaft (not separately shown) that forms part of a very schematically indicated rotor rotation transmission system 7 including a drive-train (not shown). The drive-train is essentially a mechanism for applying the rotor shaft power for some useful purpose i.e., to generate electricity and may consist of a gearbox and generator, a direct drive generator or an hydraulic pump driving a generator via a hydraulic motor.

The sleeve 5 fits sufficiently closely to the upper section 8 of the column 1 as to be selectively displaceable length ways of the column as will be considered hereinafter. The upper section 8 of the column is also streamlined by being of an overall oval/elliptical profile so as to minimise the water flow wake and to maximise the resistance to bending in the directions of water flow normal to the rotor plane.

In the embodiment of the system illustrated, the upper section 8 of the column comprises as shown in FIG. 3 two face to face twin "D" profiled part columns 9 and 10 with a gap 11 between them through which the main spar of the support structure 4 can fit.

The sleeve 5, the structure 4, and the turbine units 3 are assembled together as a composite unit to form the assembly 2. This assembly is displaceable bodily lengthways of the upper section of the column by sliding the sleeve 5 up or down the upper section 8 of the column t. The section 8 is of such length that the extent of possible displacement enables the assembly 2 to be positioned below water level WL as is shown in FIGS. 1 and 2 and positioned above water level as is shown in FIGS. 5 and 6 so that the assembly 2 can be conveniently positioned with the rotors 6 in a stopped setting for the purposes of maintenance or other activities to be carried out upon the assembly.

In FIGS. 1 and 2 the assembly 2 is shown as being located with the axes of the turbine unit rotors 6 positioned approximately halfway between the water surface WL and the seabed SB.

It will be noted from the FIG. 4 section on the line B-B of FIG. 2 that the lower or base section 13 of the column is of a solid circular cross-section. A housing 13 is provided at the upper end of the columns 9 and 10.

Whilst the above disclosed embodiment is considered advantageous and preferred by the Applicants but is not an essential element for applying this invention to a turbine installation.

Referring now to FIG. 7, this Figure is a schematic diagram showing an embodiment of a system incorporating the concepts of the present invention and in particular illustrates how the system shown therein could be applied to an installation such as that in shown in FIGS. 1 to 6.

Although FIG. 7 shows the concepts of invention as applied to a turbine installation involving two rotors the concepts of the present invention could be applied to a single turbine installation or to installations involving more that two turbine Referring now to FIG. 7 in which a rotor 20 of a turbine installation (not shown in detail) is depicted in broken lines, the direction of rotor rotation being indicated by the part circular broken line 21.

The rotor 20 is arranged to rotate a shaft 22 mounting a cam drive 23 comprising in this example of an offset circular profile. The cam drive 23 is arranged to operate a pump assembly 24. As shown the assembly 24 incorporates four cylinders 25 The cylinders 25 are, in this example, symmetrically disposed around the cam drive 23 with their centre lines or longitudinal axes in the plane of the cam drive and radially directed with respect to the shaft 22.

The pistons or plungers 26 associated with the cylinders 25 are reciprocated within their associated cylinders 25 by roller type cam followers 27 forming part of the cam drive. In practice, return spring arrangements (not shown) can be provided inside each cylinder. The pump concept illustrated in FIG. 7 can be regarded as being used purely by way of example. In practice, the pump unit/units used can be of any form suitable for the intended purpose. Other piston or plunger type pump unit configurations may be used. For example, gear, vane, lobe or other types of low speed, high pressure positive-displacement pumps could be used.

Inlet liquid i.e., inlet water for the pump assembly 24 is introduced into the cylinders 25 by way of a circular plenum or ring main 28. This water is introduced into each cylinder 25 by way of an associated non-return water inlet valve 29. That is each cylinder has a non-return water inlet valve 29.

It should be noted that the shape of this plenum or ring main 28 may vary to suit the form of the pump unit/pump installation being used and may not necessarily take the shape of a ring main 27 and four feed cylinders 25. For example, in some installations involving a single entry point to a single pump a single feed pipe may well suffice.

The higher pressure water produced by the pumping action of the pump unit/units is expelled at this higher pressure from the pump cylinders 25 via non-return valves into a higher pressure water plenum or ring main 31. This plenum/ring main 30 interconnects to an optional surge-chamber or accumulator 32 capable of absorbing pulses in the liquid flow to produce a pressure wise smoothed output is fed by way of a higher pressure main 33.

Similarly feed water to the pumps arrives at the feed plenum 27 via a low pressure supply line 34

In a multi-turbine installation as represented by FIG. 7 the pump or pump assembly 24A associated with the other turbine rotors (one such pump unit being indicated at 24A, will incorporate plenums or ring mains 27A, 31A that are hydraulically coupled to the above discussed outlet and inlet feed lines 33 and 34. In other words the inlet and out let feed lines 34,33 can be common to all of the turbines of an installation.

The high pressure water main 33 transports the high pressure water emitted from the pumps 24 to a water motor or Pelton Turbine 35 that provides an efficient and well known mechanism for obtaining a high speed output from a jet (or in some cases several jets) of water. In this case the high pressure water main 33 terminates in one (or more) nozzles 36 which cause a high velocity jet (or jets) of water to impinge on the buckets or blades 37 of the water motor or Pelton Turbine 35. In many cases a multi-jet Pelton Turbine 35 may be used although the Figure for simplicity only shows the single jet option. The advantage of a multi-jet installation is that better part-load efficiency may be gained by using fewer jets when only a limited water supply is available.

The FIG. 7 also shows the water motor or Pelton Turbine 35 driving an electrical generator 38 by way of pulleys and a belt transmission 39. This is primarily to clarify the principles being illustrated since in practice the generator 38 may in fact be direct coupled to the water motor or Pelton Turbine 35 (i.e. the shaft of the generator directly engaged with the shaft of the water motor), but equally some speed changing transmission such as a belt or belts may be used.

Since some of the water used as hydraulic fluid may leak from the circuit, especially from the high pressure pump or pumps (assemblies 24), any losses will need to be made up to ensure a continuous feed supply to the pump or pumps. In practice, it may well be desirable to allow some leakage since good clearances and less than perfect sealing will in all probability reduce the mechanical losses in the pump(s) and thereby improve the overall system efficiency. This arrangement in practice could also very probably make it easier to obtain long intervals before any pump seals need replacement.

To accommodate any such leakage a make-up water supply 40 is provided in which a header tank 41 is mounted such that its water static level 42 is immediately below the water motor or Pelton Turbine 35 as illustrated, so that if the level in the return supply pipe 34 falls significantly below that in the header tank, some make up water will flow from the header tank through a non-return valve 43 into the circuit near the top of the low pressure return supply pipe 33.

The header tank 41 is topped up when a level sensor 44 detects that the water level has fallen below some predetermined level; when this happens a small feed pump 45 is operated to draw water from the surroundings to the system through an intake with a strainer and filter system 46 and to pump it through a makeup water feed pipe 47 into the header tank 41. When the water level in the header tank 41 exceeds a predetermined height, then the feed pump 45 is switched off. In most cases said feed pump will be electrically energised.

The invention claimed is:

1. A hydraulic transmission system for deriving power from a flow of water, the system comprising:
    a water current turbine assembly submerged in a body of water containing a current, the water current turbine assembly including a flowing water actuatable rotor coupled to a rotor shaft, the rotor operationally responsive to the water current to rotate the rotor shaft,
    a pump system for a hydraulic fluid supplied from the body of water to avoid pollution of the body of water when leakage of the hydraulic fluid occurs, the pump system configured to pressurize the hydraulic fluid to actuate a power producing assembly, the pump system comprising at least one low speed, high pressure pump directly coupled to the rotor shaft, and a pressure circuit comprising a fluid supply line and a fluid return line connected between the at least one pump and the power producing assembly,
    wherein the rotor shaft is configured to drive the at least one pump to pressurize the hydraulic fluid within the fluid supply line to be applied to the power producing assembly and thereafter the hydraulic fluid is returned by way of the fluid return line to the at least one pump for retransmission in the pump system, and wherein the power producing assembly is positioned above the water current turbine assembly and includes a hydraulic motor configured to rotate in response to the pressurized hydraulic fluid at a rotation rate higher than and independent of the rotor shaft, the hydraulic motor being coupled to a drive shaft of a power generator, and
    an intake adapted to receive make up hydraulic fluid from the body of water, and a header tank configured to store the make up hydraulic fluid, the header tank connected to the intake through a make up fluid supply line and connected to the at least one pump through a make up fluid return line, wherein the header tank is disposed such that a water static level thereof is immediately below the power producing assembly, and when the level of the hydraulic fluid in the fluid return line falls below the water static level, make up hydraulic fluid stored in the header tank flows therefrom through the make up fluid return line to the at least one pump.

2. The system of claim 1, wherein the pump system comprises a plurality of positive displacement pumps.

3. The system of claim 2, wherein the plurality of pumps are operationally indirectly coupled to the common rotor shaft rotated by the rotor driven by the water current.

4. The system of claim 3, wherein the pump system comprises a cam drive coupled to the rotor shaft, each pump being symmetrically disposed around the cam drive of the rotor shaft.

5. The system of claim 1, wherein the pump system includes a plurality of low speed, high pressure pumps directly operated by the rotation of the rotor shaft, each pump having a fluid inlet including a non-return valve to control the entrance of the hydraulic fluid from the fluid return line, and a fluid outlet including a non-return valve to control the exit of the hydraulic to the fluid supply line.

6. The system of claim 1, wherein the power producing assembly comprises a Pelton wheel.

7. The system of claim 1, wherein the pump system further comprises a pressure balancing tank coupled to the fluid supply line to absorb vibrational energy of the rotor shaft.

8. The system of claim 1, wherein the pump system includes a plurality of low speed, high pressure pumps circumferentially arranged around a longitudinal axis of the rotor shaft, each pump is operated by the rotation of the rotor shaft, wherein actuation of each pump pressurizes the hydraulic fluid of each pump, the pressurized hydraulic fluid being supplied to a pressure plenum coupling each pump to the fluid supply line.

9. The system of claim 1, wherein the pump system includes a plurality of low speed, high pressure pumps circumferentially arranged around a longitudinal axis of the rotor shaft, each pump is operated by the rotation of the rotor shaft, and a filter coupled to the intake to filter the make up hydraulic fluid received through the intake before entering the header tank, where the filtered make up hydraulic fluid is returned to the plurality of pumps, wherein the make up fluid return line and the fluid return line are coupled, combining and returning the return hydraulic fluid and the make up hydraulic fluid to a return plenum coupling each pump to the fluid return line.

10. The system of claim 1, further comprising a filter coupled to the intake to filter the make up hydraulic fluid received through the intake before entering the header tank.

11. The system of claim 1, wherein the pressurized hydraulic fluid to be applied to the power producing assembly is a smooth continuous jet flow supplied through at least one nozzle, and the hydraulic motor is configured to rotate in response to said jet flow at a rotation rate higher than and independent of the rotor shaft.

12. The system of claim 1, wherein a level sensor is configured to monitor the water static level of the header tank and control the amount of the make up hydraulic fluid entering into the header tank, where when the water static level has fallen below a predetermined level, a small pump coupled to the make up fluid supply line is configured to pump the make up hydraulic fluid from the body of water.

13. The system of claim 1, wherein the hydraulic motor is coupled to a the drive shaft of the power generator though pulleys and a belt transmission.

* * * * *

UNITED STATES PATENT AND TRADEMARK OFFICE
CERTIFICATE OF CORRECTION

PATENT NO. : 7,530,224 B2
APPLICATION NO. : 10/536771
DATED : May 12, 2009
INVENTOR(S) : Peter L. Fraenkel It is certified that error appears in the above-identified patent and that said Letters Patent is hereby corrected as shown below:

In column 8, line 61 delete "a".

In column 8, line 61 delete "though" and insert "through".

Signed and Sealed this

Twenty-third Day of June, 2009

JOHN DOLL
*Acting Director of the United States Patent and Trademark Office*